(12) United States Patent
Park et al.

(10) Patent No.: US 9,317,121 B2
(45) Date of Patent: *Apr. 19, 2016

(54) APPARATUS AND METHOD FOR PROVIDING TACTILE SENSATION IN COOPERATION WITH DISPLAY DEVICE

(71) Applicant: INDUSTRY-UNIVERSITY COOPERATION FOUNDATION HANYANG UNIVERSITY, Seoul (KR)

(72) Inventors: Jong-Il Park, Seoul (KR); Byung-Kuk Seo, Seoul (KR); Dae-Sun Lee, Seoul (KR); Jung-Sik Park, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 14/236,485

(22) PCT Filed: Dec. 14, 2012

(86) PCT No.: PCT/KR2012/010922
§ 371 (c)(1),
(2) Date: Jan. 31, 2014

(87) PCT Pub. No.: WO2013/089490
PCT Pub. Date: Jun. 20, 2013

(65) Prior Publication Data
US 2014/0176432 A1    Jun. 26, 2014

(30) Foreign Application Priority Data
Dec. 15, 2011  (KR) .................. 10-2011-0135408
Oct. 29, 2012  (KR) .................. 10-2012-0120737

(51) Int. Cl.
*G06F 3/01*  (2006.01)
*G06F 3/03*  (2006.01)
(Continued)

(52) U.S. Cl.
CPC .............. *G06F 3/016* (2013.01); *G06F 3/0304* (2013.01); *G06F 3/042* (2013.01); *H04M 1/72519* (2013.01); *H04M 2250/52* (2013.01); *H04N 21/41407* (2013.01); *H04N 21/8583* (2013.01)

(58) Field of Classification Search
None
See application file for complete search history.

(56) References Cited

U.S. PATENT DOCUMENTS 6,113,395 A  *  9/2000  Hon .............................. 434/262
8,239,145 B2 * 8/2012  Suzuki .................. G06F 3/016
                                                      345/156

(Continued)

FOREIGN PATENT DOCUMENTS

JP   2001-273503 A   10/2001
JP   2008-129835 A    6/2008
(Continued)

OTHER PUBLICATIONS

Google English Translation of applicant provided JP 2008-129835 A.*

(Continued)

*Primary Examiner* — Kent Chang
*Assistant Examiner* — Nathan Brittingham
(74) *Attorney, Agent, or Firm* — Ladas & Parry LLP

(57) ABSTRACT

An apparatus and a method for providing a tactile sensation in cooperation with a display device are disclosed. The disclosed apparatus includes: a display-device communication unit configured to receive information on a virtual image from the display device; a determiner unit configured to determine whether or not a user attempts an interaction with the virtual image by using an image of a user body; and a tactile-sensation provider unit configured to provide a tactile sensation to a preset body part of the user based on a determination result of the determiner unit. The disclosed apparatus can enable the user to interact with a virtual image with verisimilitude.

12 Claims, 6 Drawing Sheets

(51) Int. Cl.
*H04M 1/725* (2006.01)
*G06F 3/042* (2006.01)
*H04N 21/414* (2011.01)
*H04N 21/858* (2011.01)

(56) References Cited

U.S. PATENT DOCUMENTS

| | | | |
|---|---|---|---|
| 2004/0210933 A1* | 10/2004 | Dresti et al. | 725/40 |
| 2010/0110384 A1* | 5/2010 | Maekawa | G02B 5/124 353/10 |
| 2010/0234094 A1* | 9/2010 | Gagner | G07F 17/32 463/20 |
| 2012/0133734 A1* | 5/2012 | Tokunaga et al. | 348/43 |
| 2012/0280920 A1* | 11/2012 | Jackson et al. | 345/173 |
| 2012/0287343 A1* | 11/2012 | Kelly | G06F 3/1438 348/554 |

FOREIGN PATENT DOCUMENTS

| | | |
|---|---|---|
| KR | 2010-0047990 A | 11/2010 |
| KR | 2011-0045589 A | 4/2011 |
| KR | 2011-0088969 A | 8/2011 |
| KR | 2011-0089969 A | 8/2011 |

OTHER PUBLICATIONS

Takayuki Iwamoto, et al; "Non-contact Method for Producing Tactile Sensation Using Airborne Ultrasound", M. Ferre (Ed.): EuroHaptics, LNCS 5024, pp. 504-513, 6th International Conference, EuroHaptics 2008 Madrid, Spain, Jun. 10-13, 2008.

Yuriko Suzuki, et al; "Air Jet Driven Force Feedback in Virtual Reality", Published by the IEEE Computer Society, Jan./Feb. 2005, pp. 44-47; IEEE Computer Graphics and Applications.

* cited by examiner (a)

(b)

APPARATUS AND METHOD FOR PROVIDING TACTILE SENSATION IN COOPERATION WITH DISPLAY DEVICE

TECHNICAL FIELD

Embodiments of the present invention relate to an apparatus and a method for providing a tactile sensation, more particularly to an apparatus and a method for providing a tactile sensation in cooperation with a display device.

BACKGROUND ART

A virtual image, such as for a stereoscopic image and augmented reality, can provide the user with a sense of realism and verisimilitude and has been the subject of various studies.

In particular, the rapid commercialization of the 3-dimensional TV in recent times has made it possible to view 3-dimensional images in places other than specialized theaters, and the amount of contents that support stereoscopic images has increased accordingly.

A 2-dimensional image shown on a typical display screen may provide interaction with a user by way of a touch method. Korean Patent Publication No. 2010-0138193 discloses a method of providing interaction to a user based on a touch screen. However, this method only provides the user with visual interaction with respect to image information, so that it is difficult to provide interaction with verisimilitude.

In order to add realism to a virtual image, it is needed to provide tactile sensations for a corresponding virtual image, and it is needed to provide tactile sensations for such a virtual image through a terminal having a limited size, but as yet such function is not being provided.

To resolve the above problem in the related art, an aspect of the present invention proposes an apparatus and a method for providing tactile sensations to provide the user with realistic interaction.

SUMMARY

To achieve the objective above, an embodiment of the present invention provides an apparatus for providing a tactile sensation in cooperation with a display device for displaying a virtual image, where the apparatus includes: a display-device communication unit configured to receive information on a virtual image from the display device; a determiner unit configured to determine whether or not a user attempts an interaction with the virtual image by using an image of a user body; and a tactile-sensation provider unit configured to provide a tactile sensation to a preset body part of the user based on a determination result of the determiner unit.

The apparatus for providing a tactile sensation may further include an image acquisition unit configured to acquire the image of the user body.

The display-device communication unit may further receive the image of the user body from the display device.

The image acquisition unit may include two or more cameras.

The determiner unit may include: a recognition unit configured to recognize the preset body part from an image acquired by the image acquisition unit; a tracker unit configured to track a body part recognized by the recognition unit to determine a position of the recognized body part; and an interaction-determiner unit configured to determine whether or not a user is attempting an interaction with the virtual image based on position information of the preset body part tracked by the tracker unit and on whether or not the virtual image is being provided.

The virtual image may include a stereoscopic image and an augmented reality object.

In cases where the virtual image is a stereoscopic image, the interaction-determiner unit may determine that an interaction is attempted if the tracked body part is moved to or within a preset threshold from the display device.

In cases where the virtual image is an augmented reality object, the interaction-determiner unit may determine that an interaction is attempted if the tracked body part is moved to or within a preset threshold from an augmented reality marker.

The tactile-sensation provider unit may provide a tactile sensation by ejecting compressed air.

The apparatus for providing a tactile sensation may further include a docking unit configured for docking with the display device.

Another aspect of the present invention provides an apparatus for providing a tactile sensation in cooperation with a display device for displaying a virtual image, where the apparatus includes: an image acquisition unit configured to acquire an image of a user body; a display-device communication unit configured to receive content data information from the display device; a determiner unit configured to determine whether or not a user attempts an interaction with the virtual image by using the image acquired by the image acquisition unit; a content analyzer unit configured to acquire a time at which a virtual image is shown and position information of the shown virtual image from the content data information; a tactile-sensation provider unit configured to provide a tactile sensation to a preset body part of the user based on a determination result of the determiner unit; and a tactile-sensation provision controller configured to adjust an ejector nozzle of the tactile-sensation provider unit based on a virtual image showing time and position acquired by the content analyzer unit.

Yet another aspect of the present invention provides a method for providing a tactile sensation in cooperation with a display device for displaying a virtual image, where the method includes: (a) acquiring an image of a user body; (b) receiving information on whether or not a virtual image is shown from the display device; (c) determining whether or not a user attempts an interaction with the virtual image by using the image acquired in said step (a) and information on whether or not the virtual image is shown; and (d) providing a tactile sensation to a preset body part of the user based on a determination result of said step (c).

Still another aspect of the present invention provides a method for providing a tactile sensation in cooperation with a display device for displaying a virtual image, where the method includes: (a) acquiring an image of a user body; (b) receiving information on whether or not a virtual image is shown and content data information from the display device; (c) acquiring a time at which the virtual image is shown and position information of the shown virtual image from the content data information; (d) adjusting an ejector nozzle for providing a tactile sensation in correspondence to a position of the virtual image, if the showing of the virtual image is predicted based on information acquired in said step (c); (e) determining whether or not a user is attempting an interaction with the virtual image by using an image acquired in said step (a) and the information on whether or not the virtual image is shown; and (f) providing a tactile sensation to a preset body part of the user based on a determination result of the determiner unit.

Yet another aspect of the present invention provides an apparatus for providing a tactile sensation in cooperation with a display device for displaying a virtual image, where the apparatus includes: a display-device communication unit configured to receive position information of a preset body part of a user and control information for providing a tactile sensation from the display device; and a tactile-sensation provider unit configured to provide a tactile sensation to the preset body part of the user based on the position information and the control information.

The present invention can enable the user to interact with a virtual image with verisimilitude.

DETAILED DESCRIPTION

Figure 1:
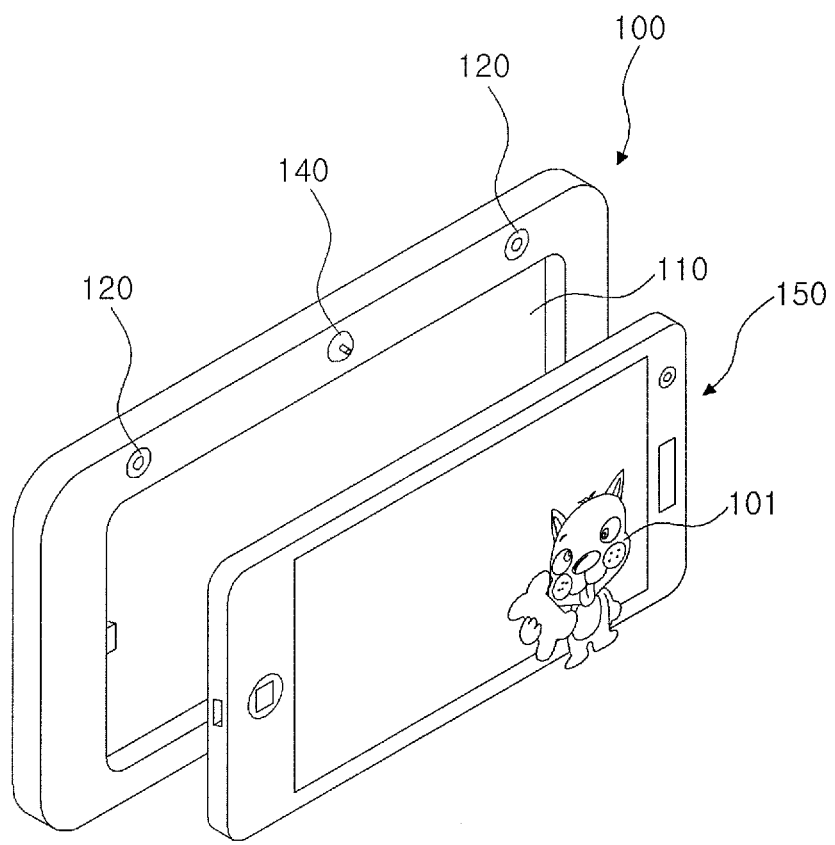
FIG. 1 illustrates an example of an apparatus for providing tactile sensations in cooperation with a display device according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

An aspect of the present invention is to propose an apparatus and a method for providing a tactile sensation in order to provide the user with an interaction having verisimilitude when the user touches a stereoscopic image.

Certain embodiments of the present invention are described below in more detail with reference to the accompanying drawings.

FIG. 1 illustrates an example of an apparatus for providing tactile sensations in cooperation with a display device according to an embodiment of the present invention.

Referring to FIG. 1, an apparatus for providing tactile sensations in cooperation with a display device according to an embodiment of the present invention can be a docking apparatus to which a display device may be mounted.

Referring to FIG. 1, an apparatus 100 for providing tactile sensations in cooperation with a display device according to an embodiment of the present invention may provide a docking unit 110 with which the display device 150 may dock.

The docking unit 110 may be equipped with a communication port (not shown) that enables data communication with the display device 150. Here, the display device 150 may include devices such as a smart phone and a portable gaming device.

The display device may display a virtual image 101, and if the user approaches with a preset body part 103 such as a hand to interact with the virtual image 101, the tactile-sensation provider unit 140 may provide a tactile sensation to the body part.

For instance, the tactile-sensation provider unit 140 can provide a tactile sensation by ejecting compressed air.

FIG. 1 illustrates a stereoscopic image shown projecting from the display, as an example of a virtual image 101. A virtual image 101 to which an embodiment of the present invention may apply can also include an augmented reality image besides a stereoscopic image. That is, the scope of a virtual image in an embodiment of the present invention can also encompass an augmented reality object shown on a real background.

The determining of whether or not an interaction with the virtual image 101 is attempted may be performed based on the position of the user's hand. For instance, it may be determined that the user is attempting an interaction with the shown virtual image if the user's hand is near the display.

Also, by using the depth information for a stereoscopic image, it can be determined that an interaction is attempted if the user's hand is at a position corresponding to the depth information of the stereoscopic image or is within a preset distance from a position corresponding to the depth information of the stereoscopic image. That is, if the depth information used for a stereoscopic image is a preset value, then it can be determined that an interaction is attempted if the user's hand is present at a position within the preset range.

In order to determine the position of the user's hand, the apparatus 100 for providing tactile sensations may be equipped with an image acquisition unit 120, and the image acquisition unit 120 may acquire images of the user's body. The image acquisition unit 120 can be implemented with a camera.

Although FIG. 1 illustrates a case in which the virtual image 101 is a stereoscopic image, it is also possible for the virtual image to be provided as an augmented reality object, and in this case, it may be determined that the user is attempting an interaction with the augmented reality object if the user's hand is near a marker for showing the augmented reality object.

The images shown on the display can be classified into regular images that are shown on the display plane and virtual images such as stereoscopic images and augmented reality objects. The term "virtual image" used herein is differentiated from regular images shown on the display and refers to a stereoscopic image object shown projecting from the display or an augmented reality object shown virtually by a marker, etc.

Thus, the image 101 shown in a projecting manner in FIG. 1 corresponds to a virtual image, while images shown on the display plane differentiated from the virtual image are not included in the scope of a virtual image.

Figure 2:
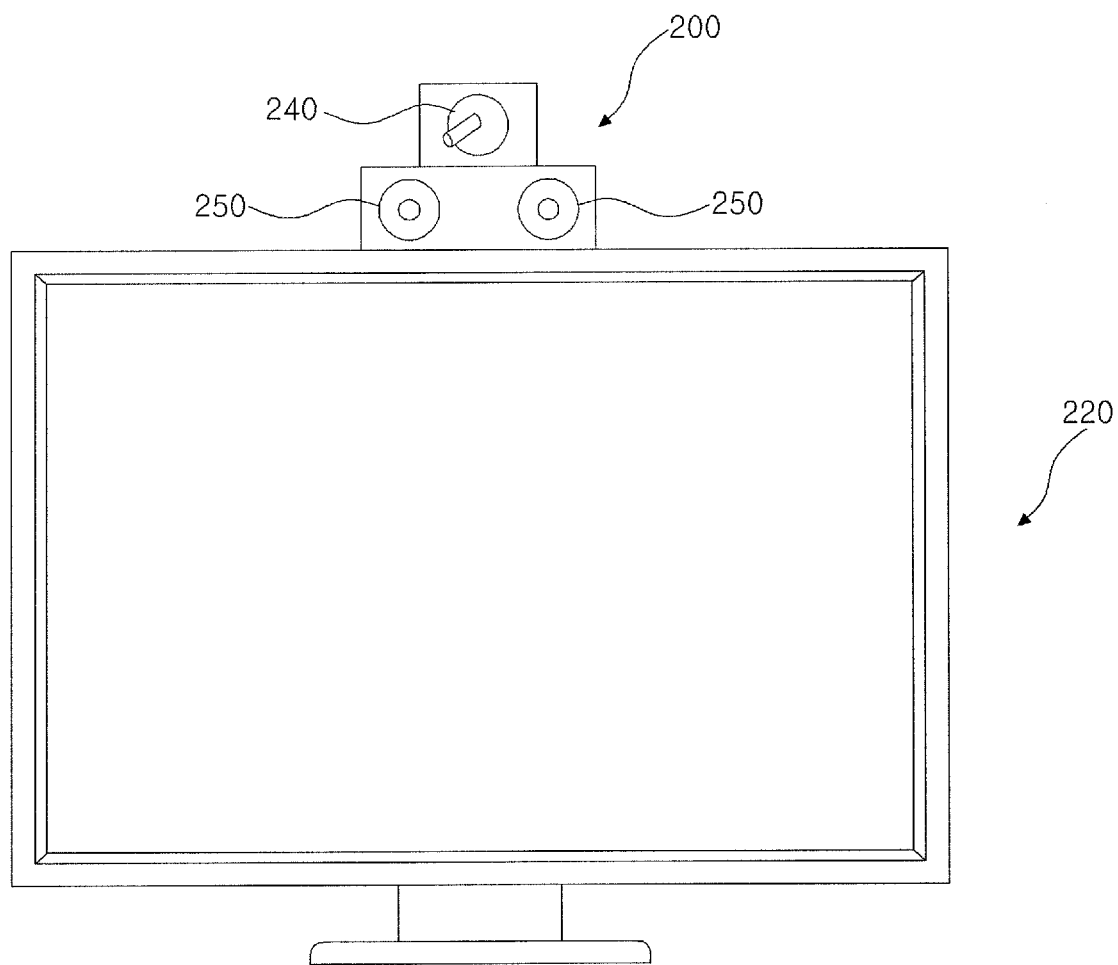
FIG. 2 illustrates an example of an apparatus for providing tactile sensations in cooperation with a display device according to another embodiment of the invention.

FIG. 2 illustrates an example of an apparatus for providing tactile sensations in cooperation with a display device according to another embodiment of the present invention.

Referring to FIG. 2, an apparatus for providing tactile sensations in cooperation with a display device according to another embodiment of the present invention can be operated attached to the display device. The embodiment illustrated in FIG. 1 shows an example of an apparatus for providing tactile sensations that can be used in cooperation with a relatively small display device, such as a smart phone and a portable gaming device, while the embodiment illustrated in FIG. 2, shows an example of an apparatus for providing tactile sensations that can be used in cooperation with a relatively large display device, such as a TV set, etc.

An apparatus for providing tactile sensations such as that illustrated in FIG. 2 can be coupled to a particular port on the display device for data communication with the display device, or can include a wireless communication module in its interior to perform wireless data communication with the display device.

An apparatus for providing tactile sensations according to the second disclosed embodiment may also be equipped with an image acquisition unit 220 and a tactile-sensation provider unit 240, where the image acquisition unit 220 may acquire images of the user body, and the tactile-sensation provider unit 240 may provide a tactile sensation to the user's body part if it is determined from the images acquired by the image acquisition unit 220 that the user is attempting to interact with a virtual image.

Figure 3:
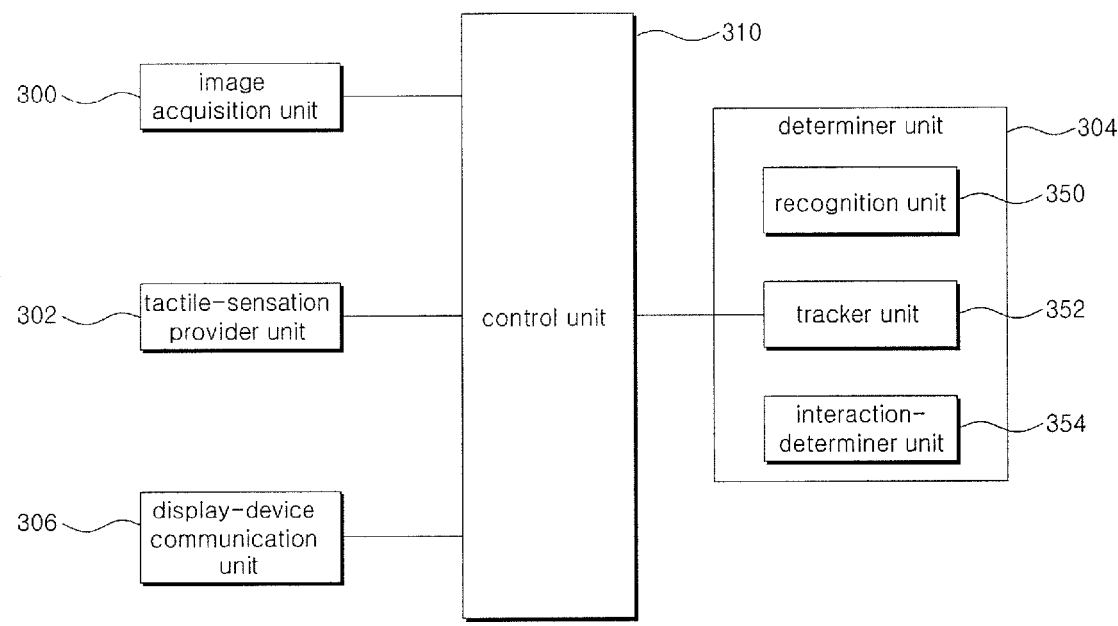
FIG. 3 is a block diagram of an apparatus for providing tactile sensations in cooperation with a display device according to a first disclosed embodiment of the present invention.

FIG. 3 is a block diagram of an apparatus for providing tactile sensations in cooperation with a display device according to a first disclosed embodiment of the present invention.

Referring to FIG. 3, an apparatus for providing tactile sensations according to a first disclosed embodiment of the present invention can include an image acquisition unit 300, a tactile-sensation provider unit 302, a determiner unit 304, a display-device communication unit 306, and a control unit 310.

A display device that cooperates with an apparatus for providing tactile sensations according to the present invention may show a virtual image. Here, the virtual image can include a stereoscopic image and an augmented reality object. In order to recognize a stereoscopic image provided by the display device, a user may be required to wear 3D glasses.

The control unit 310 may generally control the operations of the components of the apparatus for providing tactile sensations.

The image acquisition unit 300 may acquire images of the user body positioned in front of the display device. The image acquisition unit 300 can include, but is not limited to, cameras that photograph images of the user body.

According to a preferred embodiment of the present invention, the image acquisition unit 300 may preferably include two or more cameras that are capable of acquiring 3-dimensional image information of the user's body.

The display-device communication unit 306 may receive information on the virtual image from the display device. The information on the virtual image can include information on whether or not a virtual image is to be shown or information based on which it can be determined whether or not a virtual image is shown. The display device can directly provide the information on whether or not a virtual image is shown, or the display device can provide only content data, so as to allow the apparatus for providing tactile sensations of the present invention to determine whether or not a virtual image is shown by using the content data.

The display-device communication unit 306 can receive the information on the virtual image through a wire communication port or can receive the information on the virtual image through wireless communication.

The determiner unit 304 may determine whether or not to provide a tactile sensation to a preset body part of the user (e.g. the hand) by using the images acquired at the image acquisition unit 300 and the information on the virtual image received at the display-device communication unit 306.

The determiner unit 304 can determine whether or not to provide a tactile sensation based on whether or not a virtual image that allows interaction is being provided to the user and on whether or not the user is attempting to interact with the virtual image. That is, the determiner unit 304 can determine that it is needed to provide a tactile sensation when a virtual image is being provided and the user attempts to interact with the virtual image.

According to an embodiment of the present invention, the determiner unit 304 may include a recognition unit 350, a tracker unit 352, and an interaction-determiner unit 354.

The recognition unit 350 may serve to recognize a preset body part of the user from the images acquired through the image acquisition unit 300. For example, the recognition unit 350 may serve to recognize the user's hand portion from the images of the user body obtained from the image acquisition unit 300. There are many known methods for recognizing a particular body part of the user from images; therefore, a detailed description of such methods is omitted.

The tracker unit 352 may track the movement of the recognized body part (e.g. the hand) of the user. A separate sensor can also be used in order to identify the position of the user's hand more precisely.

The interaction-determiner unit 354 may determine whether or not the user is attempting an interaction with the virtual image through the information tracked by the tracker unit 352, and based on this, may determine whether or not to provide a tactile sensation.

As described above, if the user brings a hand near in the direction of the stereoscopic image (the direction of the display device) or brings a hand near a marker for showing an augmented reality, then it can be determined that the user is attempting an interaction with the virtual image.

The tactile-sensation provider unit 302 may provide a tactile sensation to a preset body part (the hand) if the determiner unit 304 determines that it is necessary to provide a tactile sensation. According to a preferred embodiment of the present invention, the tactile-sensation provider unit 302 can be an ejector that ejects compressed air.

As illustrated in FIG. 1, the tactile-sensation provider unit 302 can be installed on a front surface of the display device and can eject compressed air when the user's hand is brought near. When ejecting the compressed air, the compressed air can be ejected based on the position information tracked by the tracker unit 352 of the determiner unit 304.

In cases where an embodiment of the present invention is applied to augmented reality, the tactile-sensation provider unit 302 can also be installed on a back surface of the display device and can eject compressed air when the user's hand is brought near a marker.

Figure 4:
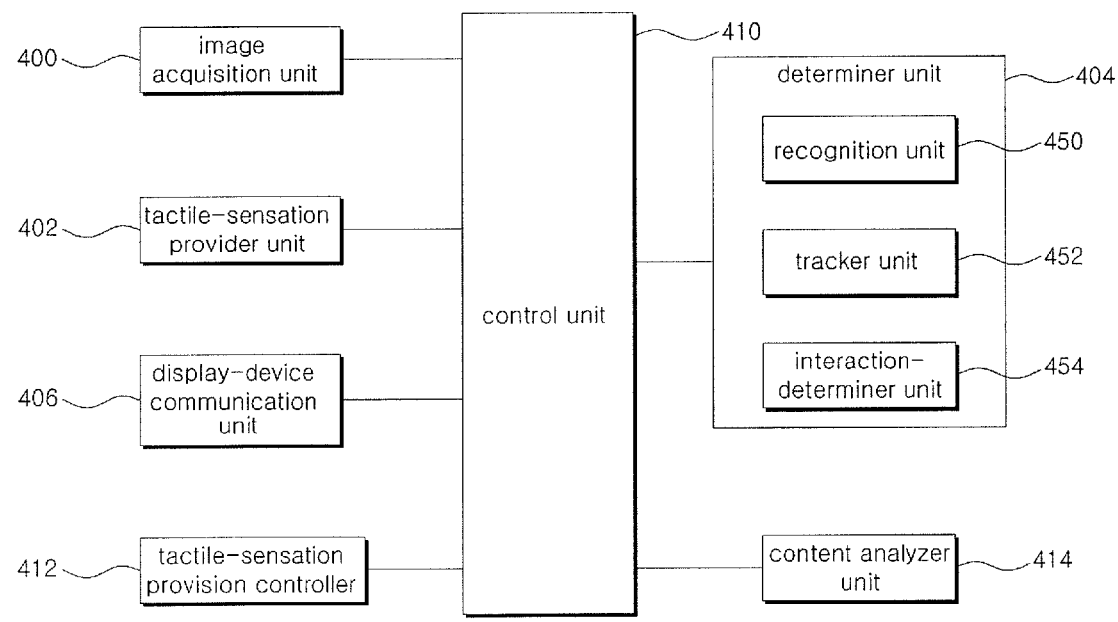
FIG. 4 is a block diagram of an apparatus for providing tactile sensations in cooperation with a display device according to a second disclosed embodiment of the present invention.

FIG. 4 is a block diagram of an apparatus for providing tactile sensations in cooperation with a display device according to a second disclosed embodiment of the present invention.

Referring to FIG. 4, an apparatus for providing tactile sensations according to a second disclosed embodiment of the present invention can include an image acquisition unit 400, a tactile-sensation provider unit 402, a determiner unit 404, a display-device communication unit 406, a control unit 410, a tactile-sensation provision controller 412, and a content analyzer unit 414.

In the block diagram of FIG. 4, the functions of the image acquisition unit 400, tactile-sensation provider unit 402, determiner unit 404, display-device communication unit 406, and control unit 410 are the same as those of the components of the apparatus for providing tactile sensations illustrated in FIG. 3.

The image acquisition unit 400 acquires images of the user's body, and the determiner unit 404 determines whether or not the user attempts an interaction with the virtual image by recognizing a preset body part from the images acquired by the image acquisition unit 404 and tracking the body part.

If it is determined at the determiner unit 404 that the user is attempting an interaction with the virtual image, the tactile-sensation provider unit 402 may eject compressed air to provide a tactile sensation.

The apparatus for providing tactile sensations according to the second disclosed embodiment of the present invention, as illustrated in FIG. 4, differs from the first disclosed embodiment of the invention in that the content may be analyzed beforehand and the position of the nozzle may be pre-adjusted such that the compressed air ejector nozzle of the tactile-sensation provider unit faces the virtual image beforehand, in order to avoid delays in providing the user with tactile sensations.

Figure 5:
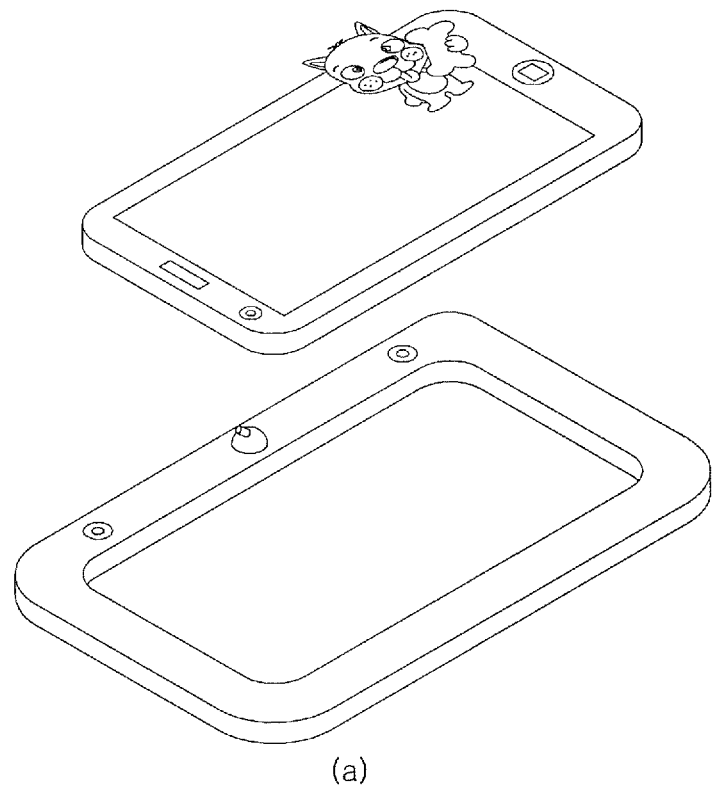
FIG. 5A and FIG. 5B illustrate the need for presetting the position of the ejector nozzle in an apparatus for providing tactile sensations according to the second disclosed embodiment of the present invention.
Figure 5:
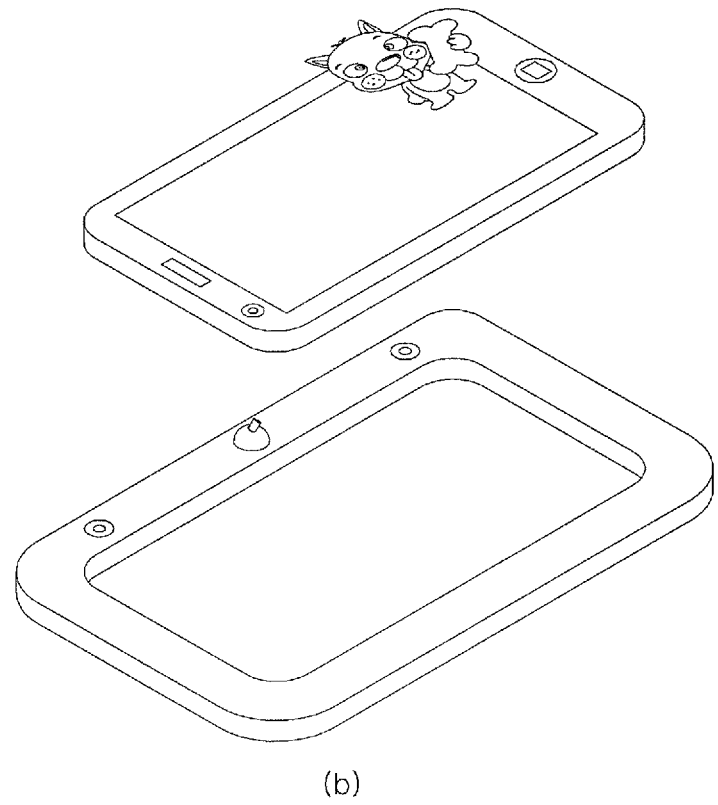

FIG. 5A and FIG. 5B illustrate the need for presetting the position of the ejector nozzle in an apparatus for providing tactile sensations according to the second disclosed embodiment of the present invention.

Referring to FIG. 5A, a virtual image is shown at the right side of a display device, while the ejector nozzle is positioned to eject compressed air towards the left side of the display device.

If a virtual image is being provided as in FIG. 5A when it is determined that the user is attempting to interact with the virtual image, then the ejector nozzle may eject the compressed air after moving to the position of the virtual image.

In cases where the compressed air is ejected after the ejector nozzle is moved to the position of the virtual image, then a delay can occur when providing a tactile sensation, because the compressed air is ejected after the ejector nozzle is moved.

An apparatus for providing tactile sensations according to the second disclosed embodiment of the present invention may adjust the position of the nozzle of the apparatus, as in FIG. 5B, to prevent the occurrence of such delay. If it is predicted that a virtual image will be displayed at the right side of the display device, then the apparatus for providing tactile sensations according to the second disclosed embodiment may adjust the position of the nozzle beforehand towards the right side.

Because of this, when the user attempts to interact with the shown virtual image, it is possible to provide a tactile sensation immediately without delay.

In order to perform the operation described above, an apparatus for providing tactile sensations according to the second disclosed embodiment may additionally include a tactile-sensation provision controller 412 and a content analyzer unit 414.

The display-device communication unit 406 may receive content data information from the display device, and the content analyzer unit 414 may analyze the received content data information to acquire time information and position information relating to when and where a virtual image is to be shown.

In one example, the content analyzer unit 414 can analyze content data to extract the time information and position information. In another example, the content data information received through the display-device communication unit 406 may be the time information and position information of a virtual image analyzed beforehand, and the content analyzer unit 414 can read the received information to acquire the time information and position information of the virtual image.

The acquiring of the time information and position information of the virtual image at the content analyzer unit 414 can be achieved by various methods other than the method described above, and it would be obvious to those skilled in the art that changing the method of acquisition has no bearing on the scope of the present invention.

The tactile-sensation provision controller 412 may use the time information and position information of the virtual image provided from the content analyzer unit 414 to provide control information for adjusting the position of the ejector nozzle of the tactile-sensation provider unit 402.

The tactile-sensation provision controller 412 may provide the control information to adjust the position of the ejector nozzle such that the ejector nozzle is positioned in correspondence to the position of the virtual image before the virtual image is shown. For example, if it is predicted from the analysis information of the content analyzer unit 414 that a virtual image will be shown at the center of the display screen at the play time of 1 minute 20 seconds, then the tactile-sensation provision controller 412 may provide the control information such that the ejector nozzle faces the center of the screen before the 1 minute 20 second play time.

After the position of the ejector nozzle of the tactile-sensation provider unit 402 is preset according to the control of the tactile-sensation provision controller 412, if the determiner unit 404 determines that the user is attempting an interaction with the virtual image, then the tactile-sensation provider unit 402 may eject compressed air to the user's hand that was being tracked.

When the user attempts to interact with the virtual image, the user's hand would move to the position of the virtual image, and since the ejector nozzle is set beforehand to face the virtual image, the user can be provided with a tactile sensation without a particular delay.

FIG. 3 and FIG. 4 illustrate cases in which an apparatus for providing tactile sensations according to an embodiment of the present invention is equipped with an image acquisition unit and a determiner unit. However, it would be obvious to those skilled in that art that the image acquisition unit and the determiner unit can also be equipped on the display device instead of the apparatus for providing tactile sensations according to the present invention, and that either one of the image acquisition unit and the determiner unit can be equipped on the display device.

In cases where the image acquisition unit and the determiner unit are equipped on the display device, the apparatus for providing tactile sensations according to the present invention may receive the position information relating to the preset body part of the user and the control information for providing a tactile sensation through the display-device communication unit from the display device, and may operate to eject compressed air to a corresponding position.

In cases where the image acquisition unit is equipped on the display device and the determiner unit is equipped on the apparatus for providing tactile sensations according to the present invention, the display-device communication unit may receive image information from the image acquisition unit equipped on the display device, and the determiner unit may operate to determine whether or not the user attempts an interaction by using the acquired image information.

Figure 6:
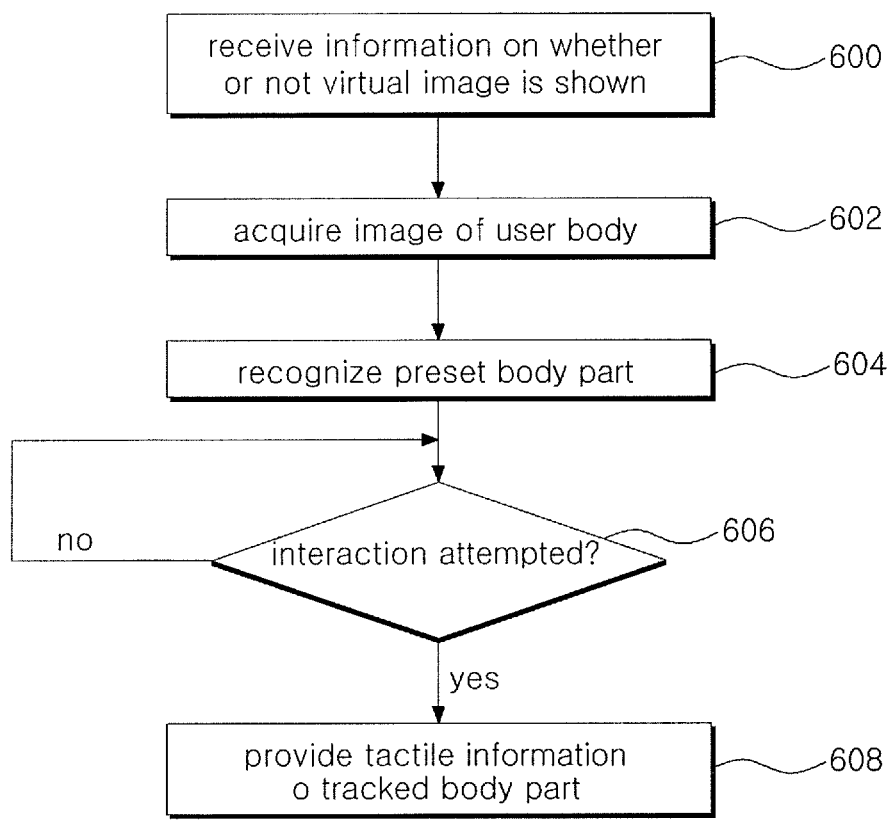
FIG. 6 is a flowchart illustrating the operations of an apparatus for providing tactile sensations in cooperation with a display device according to a first disclosed embodiment of the present invention.

FIG. 6 is a flowchart illustrating the operations of an apparatus for providing tactile sensations in cooperation with a display device according to a first disclosed embodiment of the present invention.

Referring to FIG. 6, an apparatus for providing tactile sensations according to an embodiment of the present invention may receive information on whether or not a virtual image is shown from the display device (step 600). For example, information on whether or not a virtual image is currently being shown can be provided from the display device, or information on the play times of virtual images can be provided.

Also, an apparatus for providing tactile sensations according to the present invention may use an image acquisition means such as a camera to acquire images of a user body (step 602). In order to obtain 3-dimensional position information of the user body, it may be preferable to use two or more cameras for acquiring the images.

When the images of the user body are acquired, a preset body part may be recognized from the acquired images (step 604). Since the user's hand would mainly be used in the interaction, as described above, the user's hand can be recognized from the acquired images.

When a particular body part is recognized from the acquired images, the recognized body part may be tracked (step 604). To be more specific, the position information of the recognized body part (hand) may be tracked, and information on the distance from the display can be tracked in cases where the virtual image is a stereoscopic image, while information on the distance from the marker can be tracked in cases where the virtual image is an augmented reality object.

While tracking the recognized body part, it may be determined whether or not the user attempts an interaction with the virtual image (step 606). As described above, it can be determined that the user is attempting an interaction when the user moves a body part (the hand), which is being tracked, near to the virtual image.

If it is determined that the user is attempting to interact with the virtual image, a tactile sensation may be provided to the body part being tracked (step 608). A tactile-sensation provider unit may provide a tactile sensation based on the position information of the body part being tracked, and as described above, can provide the tactile sensation by ejecting compressed air onto the body part.

Although it is not illustrated in FIG. 6, when the user attempts to interact with the virtual image, the virtual image can be changed in response to the user's interaction.

Figure 7:
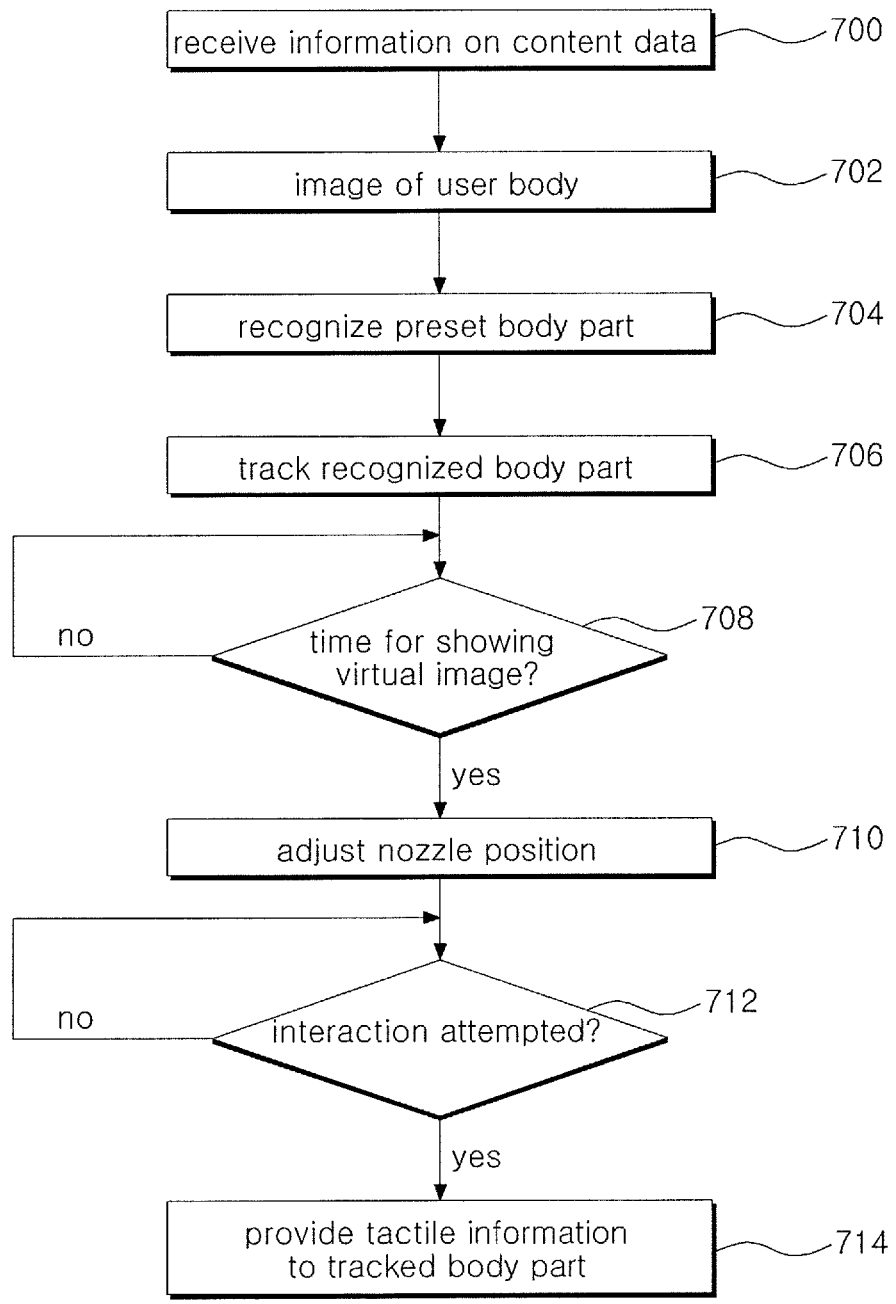
FIG. 7 is a flowchart illustrating the operations of an apparatus for providing tactile sensations in cooperation with a display device according to a second disclosed embodiment of the present invention.

FIG. 7 is a flowchart illustrating the operations of an apparatus for providing tactile sensations in cooperation with a display device according to a second disclosed embodiment of the present invention.

Referring to FIG. 7, an apparatus for providing tactile sensations according to a second disclosed embodiment of the present invention may receive information on content data from a display device (step 700). The information on content data received in the second disclosed embodiment can be content data that requires analysis or can also be information that is primarily analyzed at the display device to include the play time and position information of virtual images.

The procedures for acquiring images of the user body (step 702), recognizing a preset body part (step 704), and tracking the recognized body part (step 706) may be performed in the same way as in FIG. 6.

Based on the analysis results of the content analyzer unit, it may be determined whether or not it is time when a virtual image is to be shown (step 708).

If it is time when a virtual image is to be shown, the position of the nozzle of the tactile-sensation provider unit may be adjusted based on the position information of the virtual image acquired by the content analyzer unit (step 710).

By tracking the body part of the user, it may be determined whether or not the user attempts to interact with the virtual image (step 712).

If the user attempts an interaction with the virtual image, a tactile sensation may be provided to the body part being tracked (step 714).

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. An apparatus for providing a tactile sensation in cooperation with a display device for displaying a virtual image, the apparatus comprising:
   a communication unit configured to receive information on a virtual image and the image of the user body from the display device;
   a determiner unit configured to determine whether or not a user attempts an interaction with the virtual image by using the image of the user body;
   a tactile-sensation provider unit configured to provide a tactile sensation to a preset body part of the user based on a determination result of the determiner unit;
   a tactile-sensation provision controller configured to adjust a position of an ejector nozzle of the tactile-sensation provider such that the ejector nozzle is positioned in correspondence to the position of the virtual image; and
   wherein, when a showing of the virtual image is predicted, the tactile-sensation provision controller adjusts the position of the elector nozzle in correspondence to the position of the virtual image.

2. The apparatus for providing a tactile sensation according to claim 1, wherein the determiner unit comprises:
   a recognition unit configured to recognize the preset body part from the image of the user body;
   a tracker unit configured to track a body part recognized by the recognition unit to determine a position of the recognized body part; and
   an interaction-determiner unit configured to determine whether or not a user is attempting an interaction with the virtual image based on position information of the preset body part tracked by the tracker unit.

3. The apparatus for providing a tactile sensation according to claim 1, wherein the virtual image comprises a stereoscopic image and an augmented reality object.

4. The apparatus for providing a tactile sensation according to claim 3, wherein, when the virtual image comprises a stereoscopic image, the interaction-determiner unit determines that an interaction is attempted if the tracked body part is moved to or within a preset threshold from the display device.

5. The apparatus for providing a tactile sensation according to claim 3, wherein, when the virtual image comprises an augmented reality object, the interaction-determiner unit determines that an interaction is attempted if the tracked body part is moved to or within a preset threshold from an augmented reality marker.

6. The apparatus for providing a tactile sensation according to claim 1, wherein the tactile-sensation provider unit provides a tactile sensation by ejecting compressed air.

7. The apparatus for providing a tactile sensation according to claim 1, further comprising a docking unit configured to dock with the display device.

8. An apparatus for providing a tactile sensation in cooperation with a display device for displaying a virtual image, the apparatus comprising:
- an image acquisition unit configured to acquire an image of a user body;
- a communication unit configured to receive content data information;
- a determiner unit configured to determine whether or not a user attempts an interaction with the virtual image by using the image acquired by the image acquisition unit;
- a content analyzer unit configured to acquire a time at which a virtual image is shown and position information of the shown virtual image from the content data information;
- a tactile-sensation provider unit configured to provide a tactile sensation to a preset body part of the user based on a determination result of the determiner unit;
- a tactile-sensation provision controller configured to adjust a position of an ejector nozzle of the tactile-sensation provider unit in correspondence to a position of the virtual image based on a virtual image showing time and position acquired by the content analyzer unit, and
- wherein, when a showing of the virtual image is predicted based on the virtual image showing time, the tactile-sensation provision controller adjusts the position of the elector nozzle in correspondence to the position of the virtual image.

9. The apparatus for providing a tactile sensation according to claim 8, wherein the determiner unit comprises:
- a recognition unit configured to recognize the preset body part from an image acquired by the image acquisition unit;
- a tracker unit configured to track a body part recognized by the recognition unit to determine a position of the recognized body part; and
- an interaction-determiner unit configured to determine whether or not a user is attempting an interaction with the virtual image based on a position of the preset body part tracked by the tracker unit.

10. The apparatus for providing a tactile sensation according to claim 8, wherein the virtual image comprises a stereoscopic image and an augmented reality object.

11. The apparatus for providing a tactile sensation according to claim 8, wherein the tactile-sensation provider unit provides a tactile sensation by ejecting compressed air.

12. A method for providing a tactile sensation for a virtual image, the method comprising:
- (a) acquiring an image of a user body from a display device for the virtual image;
- (b) receiving information on the virtual image from the display device;
- (c) determining whether or not a user attempts an interaction with the virtual image by using the image acquired in said step (a) and information on the virtual image;
- (d) providing a tactile sensation to a preset body part of the user based on a determination result of said step (c); and
- (e) adjusting a position of an ejector nozzle for providing a tactile sensation in correspondence to a position of the virtual image when a showing of the virtual image is predicted.

\* \* \* \* \*